June 1, 1965  J. J. JONES  3,186,121
FISHING TACKLE RETRIEVERS
Filed July 5, 1963

INVENTOR.
JESSE J. JONES,
BY
McMorrow, Berman & Davidson
ATTORNEYS

3,186,121
FISHING TACKLE RETRIEVERS
Jesse J. Jones, R.R. 1, Box 110, La Grange, N.C.
Filed July 5, 1963, Ser. No. 292,953
4 Claims. (Cl. 43—17.2)

This invention relates to a novel retriever for snagged fishing tackle, including plugs and snelled hooks.

The primary object of the invention is the provision of a generally improved device of the kind indicated, which is more practical and efficient, is easier to manipulate, which substantially preclude damage to fishhooks, snells, and plugs, and the like in freeing the same from snags, while providing means for effectively cutting vines, twigs, underbrush and the like, for freeing tackle snagged therein.

Another object of the invention is the provision of a device of the character indicated above, from which hooks on plugs and plugs, and the like themselves, as well as snelled hooks, can be easily and quickly removed from the device, after retrieval, without damage thereto.

A further object of the invention is the provision of a simpler device of the character indicated above, which involves only two parts, one of which is adjustable lengthwise relative to the other.

Other important objects and advantageous features of the invention will be apparent from the following description and the accompanying drawing, wherein, for purposes of illustration only, a specific form of the invention is set forth in detail.

Figure 1:
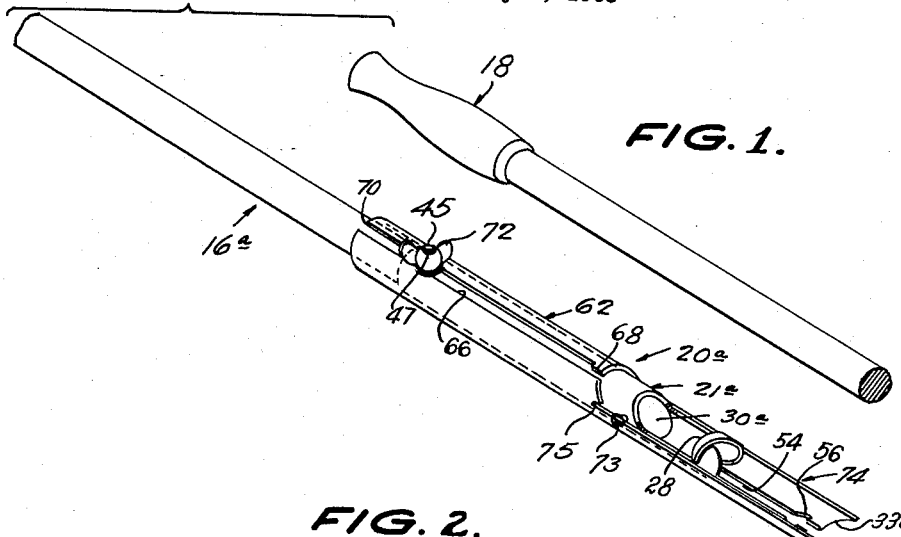
FIGURE 1 is a fragmentary and exploded perspective view of the device.

Referring to the drawing, FIGURES 1 to 4 of such drawing show a device which is especially efficient for retrieving plugs P, comprises a pole or rod $16a$, on whose forward end is engaged a stationary cylindrical tube $21a$ having a sidewall $22a$, formed in its top with a longitudinally elongated slot $24a$, having a concavely curved rear end $26a$, and a right-angular forward end $28a$. The forward end of the rod $16a$ is formed with a downwardly and forwardly angled ramp $30a$, leading downwardly from the rear end $26a$ of the slot $24a$.

Figure 2:
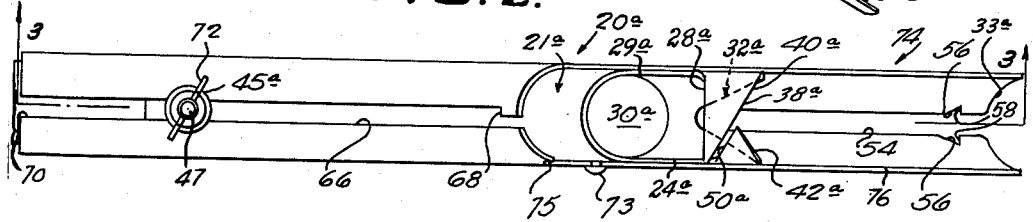
FIGURE 2 is an enlarged top plan view thereof.
Figure 3:
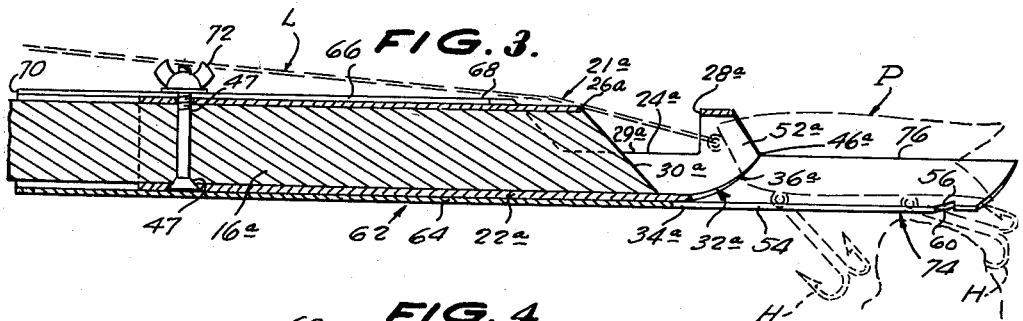
FIGURE 3 is a longitudinal section taken on the line 3—3 of FIGURE 2, showing, in phantom lines, a plug engaged therewith.
Figure 4:
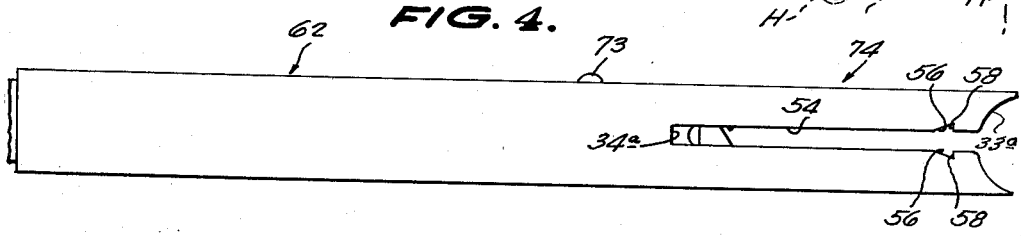
FIGURE 4 is a bottom plan view of FIGURE 3.

Wings $52a$ are formed in the forward end of the sidewall $22a$, forwardly of the slot $24a$, by cutting away the bottom of the sidewall $22a$ to provide a forwardly opening V-shaped notch $32a$ having forwardly divergent side edges $36a$, which can be sharpened, as shown in FIGURE 3; and by cutting away the top of the sidewall $22a$, as shown in FIGURE 2, to define a longitudinally shallow V-shaped notch $38a$, having forwardly divergent first and second or left- and right-hand side edges $40a$ and $42a$, which are disposed at an obtuse angle to each other. The edges $40a$ and $42a$ meet, at their forward or lower ends, with the forward or upper ends of the side edges $36a$ of the bottom notch $32a$, in points $46a$, as shown in FIGURE 3. The edges $40a$ and $42a$ can be sharpened as shown in FIGURE 3.

The top of the tube sidewall $22a$ is formed with a transversely elongated relatively narrow parallel-sided line-receiving slot $50a$ which opens to the apex of the top notch $38a$ and to the forward end of the slot $24a$, at the right-hand side of the latter. The rear edge of the slot $50a$ is disposed at the same angle as and is a continuation of the side edge $40a$ of the notch $38a$.

The tube $21a$ is fixed in place on the rod $16a$ by means of a bolt $45a$, extending through diametrically opposed holes $47$, formed in the tube sidewall $22a$, at a location spaced rearwardly from the slot $24a$.

A sleeve $62$, longer than the tube $21a$, is slidably circumposed thereon. The sidewall $64$ of the sleeve $62$ is formed, in its top, with a longitudinally elongated slot $66$ having a partially closed forward end $68$, and opening through the rear end $70$ thereof, through which the bolt $45a$ extends. The bolt $45a$ is provided, on its upper end, with a wing nut $72$, adapted to bear upon the upper surface of the sleeve $62$ and secure the same in longitudinally adjusted relationship to the tube $21a$. A lateral stop $73$ on the tube $21a$ and riding a side edge of the slot $24a$, is provided to engage in a notch $75$ in the forward end of the rear portion of the sleeve $62$, and serves to limit forward movement of the sleeve relative to the tube $21a$.

The forward part $74$ of the sleeve $62$ normally extends forwardly beyond the forward end of the tube $21a$, as shown in FIGURES 1 to 4.

The bottom of the forward part $74$ is formed with a centered, longitudinally elongated, relatively narrow fishhook receiving slot $54$, leading rearwardly from the apex of a V-shaped forwardly opening bottom notch $33a$, and terminating, at its rear end, as indicated at $34a$. The side edges of the bottom slot $54$ are formed, at a point near to and spaced rearwardly from the apex of the bottom notch $33a$, with opposed right-triangular notches $56$. The altitude sides $58$ of these notches are disposed at right angles to the side edges of the slot $54$, with their hypotenuse sides $60$ extending inwardly and rearwardly to these side edges, so that the altitude sides $58$ can act as stops to prevent hooks H on a plug P, positioned in the slot $54$ from escaping forwardly therefrom.

The forward part $74$ of the sleeve $62$ is semi-cylindrical in cross section, and is devoid of a top portion, and the side edges $76$ of this forward part are on a level with the side edges $29a$ of the slot $24a$ of the tube $21a$.

The adjustability of the sleeve $62$, relative to the tube $21a$ is mainly used to enable the sleeve $62$ to be retracted to a storage position with the forward part $74$ beneath the tube $21a$, when the device is not in use, but can also be used to adjust the distance the sleeve $62$ extends beyond the forward end of the tube $21a$, to accommodate plugs P of different lengths.

In use and operation, the line L attached to a snagged plug P is passed through the transverse slot $50a$, so that it extends lengthwise and is confined within the tube $21a$. The retriever $20a$ is then worked forwardly along the line L, as a guide, until the forward part $74$ of the sleeve $62$ reaches a position beneath the snagged plug P, as shown in FIGURE 3. The side edges of the notch $33a$ are then pushed against the crook of a snagged hook H, so as to free the same from the snag. Hooks at either end of the plug may be so engaged and freed, the hook then in a rearward position being engaged in the bottom slot, as shown in FIGURE 3. In the event that the plug is surrounded by debris, the sleeve $62$ can be retracted and locked in place, by means of the bolt $45a$, so that the wings $52a$ of the tube $21a$ can be utilized to cut away the debris, preliminary to extending the sleeve $62$ again for freeing the plug P from the snag. Once the plug P has been freed, a pull on the line L will draw the plug partially into the tube $21a$, so that the plug can be carried out of the water by retracting the device.

Although there have been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A device of the character described, comprising a rod, a retriever secured on and extending forwardly beyond the forward end of the rod, said retriever comprising a cylindrical tube having a wall provided with a forward end and a rearward end, the top of said wall between the forward and rearward ends being cut away to define a longitudinally-elongated slot, the bottom of said wall being cut away inwardly from the forward end to define a forwardly-opening notch, the top of said wall being cut away inwardly from the forward end to define a short forwardly-opening notch, said notches lying along the longitudinal center line of said tube, the portion of said tube between each of the adjacent sides of said notches forming a wing, the wings being opposed to and laterally-spaced from each other, there being a transversely-elongated line-admitting slot extending inwardly from the notched side of one of said wings to and merging into said slot in the top of said wall, a sleeve having a rear portion slidably and rotatably circumposed on the tube and having a forward portion extending forwardly beyond the forward end of the tube, and means for locking the sleeve in longitudinally adjusted relation to the tube.

2. A device of the character described, comprising a rod, a retriever secured on and extending forwardly beyond the forward end of the rod, said retriever comprising a cylindrical tube having a wall provided with a forward end and a rearward end, the top of said wall between the forward and rearward ends being cut away to define a longitudinally-elongated slot, the bottom of said wall being cut away inwardly from the forward end to define a forwardly-opening notch, the top of said wall being cut away inwardly from the forward end to define a short forwardly-opening notch, said notches lying along the longitudinal center line of said tube, the portion of said tube between each of the adjacent sides of said notches forming a wing, the wings being opposed to and laterally-spaced from each other, there being a transversely-elongated line-admitting slot extending inwardly from the notched side of one of said wings to and merging into said slot in the top of said wall, a sleeve having a rear portion slidably and rotatably circumposed on the tube and having a forward portion extending forwardly beyond the forward end of the tube, and means for locking the sleeve in longitudinally adjusted relation to the tube, comprising a bolt extending through the rod and tube, said sleeve being formed with a longitudinal slot receiving the bolt, said bolt having a nut on one end thereof adapted to be tightened against the sleeve.

3. A device of the character described, comprising a rod, a retriever secured on and extending forwardly beyond the forward end of the rod, said retriever comprising a cylindrical tube having a wall provided with a forward end and a rearward end, the top of said wall between the forward and rearward ends being cut away to define a longitudinally-elongated slot, the bottom of said wall being cut away inwardly from the forward end to define a forwardly-opening notch, the top of said wall being cut away inwardly from the forward end to define a short forwardly-opening notch, said notches lying along the longitudinal center line of said tube, the portion of said tube between each of the adjacent sides of said notches forming a wing, the wings being opposed to and laterally-spaced from each other, there being a transversely-elongated line-admitting slot extending inwardly from the notched side of one of said wings to and merging into said slot in the top of said wall, a sleeve having a rear portion slidably and rotatably circumposed on the tube and having a forward portion extending forwardly beyond the forward end of the tube, and means for locking the sleeve in longitudinally adjusted relation to the tube, said forward portion of the sleeve being substantially semi-cylindrical in cross section with its concave side upward, the bottom of said forward portion being formed in its forward end with a V-shaped forwardly opening notch, and with a centered longitudinal fishhook receiving slot opening to the apex of the notch.

4. A device of the character described, comprising a rod, a retriever secured on and extending forwardly beyond the forward end of the rod, said retriever comprising a cylindrical tube having a wall provided with a forward end and a rearward end, the top of said wall between the forward and rearward ends being cut away to define a longitudinally-elongated slot, the bottom of said wall being cut away inwardly from the forward end to define a forwardly-opening notch, the top of said wall being cut away inwardly from the forward end to define a short forwardly-opening notch, said notches lying along the longitudinal center line of said tube, the portion of said tube between each of the adjacent sides of said notches forming a wing, the wings being opposed to and laterally-spaced from each other, there being a transversely-elongated line-admitting slot extending inwardly from the notched side of one of said wings to and merging into said slot in the top of said wall, a sleeve having a rear portion slidably and rotatably circumposed on the tube and having a forward portion extending forwardly beyond the forward end of the tube, and means for locking the sleeve in longitudinally adjusted relation to the tube, said forward portion of the sleeve being substantially semi-cylindrical in cross section with its concave side upward, the bottom of said forward portion being formed in its forward end with a V-shaped forwardly opening notch, and with a centered longitudinal fishhook receiving slot opening to the apex of the notch, the sides of the fishhook receiving slot being formed near their forward ends with opposed right-triangular notches having their altitude sides disposed at right angles thereto.

References Cited by the Examiner

UNITED STATES PATENTS

| 2,164,907 | 7/39 | Falkner | 43—53.5 |
| 2,893,157 | 7/59 | Foley | 43—17.2 |

ABRAHAM G. STONE, *Primary Examiner.*